UNITED STATES PATENT OFFICE.

CHARLES J. VAN DEPOELE, OF CHICAGO, ILLINOIS.

COMPOSITION OF MATTER FOR INSULATING ELECTRIC CONDUCTORS.

SPECIFICATION forming part of Letters Patent No. 353,653, dated November 30, 1886.

Application filed April 28, 1886. Serial No. 200,467. (No specimens.)

*To all whom it may concern:*

Be it known that I, CHARLES J. VAN DEPOELE, a citizen of the United States, residing at Chicago, in the county of Cook, State of Illinois, have invented certain new and useful Improvements in Composition of Matter for Insulating Electric Conductors, of which the following is a description.

My invention relates to a new and useful composition of matter for the purpose of insulating electric conductors, the particulars of which will be hereinafter fully set forth.

The principle ingredient of my improved insulating material is mica in a finely-divided state, and I propose to mix with it earthy and silicious substances in sufficient proportions to form a thick pasty mass, which is then molded in the desired shape and allowed to dry, after which the objects are soaked in boiling oil to render them completely water-proof. In some instances they are baked or burned to give the requisite strength.

The pulverized mica and silicate of soda are the main elements in my insulating compound, the earthy material being added only to supply sufficient pulverulent material to give the necessary homogeneity to the mass to produce objects possessing the desired strength.

It is not always necessary that the insulator should be baked after being molded from the plastic mass, because I contemplate using in many instances plaster-of-paris in considerable proportions, the presence of which will give sufficient hardness without baking. The ingredients are to be mixed by suitable machinery and then forced into molds, where they can be dried or baked, according to circumstances.

Some of the proportions in which I propose to use the materials heretofore referred to, are as follows: Pulverized mica, fifty parts; sand or earthy substance, fifty parts; silicate of soda, sufficient to form a thick paste. Pulverized mica, one hundred parts; plaster-of-paris, fifty parts; ocher, ten parts; silicate of soda, enough to form a thick paste. Pulverized mica, one hundred parts; paris-white, fifty parts; ocher, ten parts; silicate of soda, glue, or other adhesive substance, sufficient to form a thick paste.

Another modification of these portions and materials is as follows: Pulverized mica, one hundred parts; red lead, ten parts; yellow ocher, ten parts; lime, ten parts; silicate of soda, enough to form a thick paste.

It will be understood from the foregoing that pulverized mica and an earthy substance united by silicate of soda constitute the essential elements of my composition, and that for particular purposes many slight additions may be made without departing from the spirit of the invention.

In some instances mineral wool may be used instead of the mica with very good result.

Having described my invention, what I claim, and desire to secure by Letters Patent, is—

1. The herein-described insulating material, consisting of pulverized mica, silicate of soda, and an earthy substance, as set forth.

2. In insulating material composed of pulverized mica, silicate of soda, and a pulverulent earthy substance, substantially in the proportions stated.

In testimony whereof I affix my signature in presence of two witnesses.

CHARLES J. VAN DEPOELE.

Witnesses:
 AARON K. STILES,
 JOHN R. HOLLISTER.